United States Patent [19]

Ellgen et al.

[11] Patent Number: 5,641,465
[45] Date of Patent: Jun. 24, 1997

[54] LITHIUM MAGANESE OXIDE COMPOUND AND METHOD OF PREPARATION

[75] Inventors: Paul C. Ellgen, Oklahoma City; Terrell N. Andersen, Edmond, both of Okla.

[73] Assignee: Kerr-McGee Chemical Corporation, Oklahoma City, Okla.

[21] Appl. No.: 524,597

[22] Filed: Sep. 7, 1995

[51] Int. Cl.$^6$ .................................................. H01M 4/50
[52] U.S. Cl. ...................... 423/50; 423/179.5; 423/599; 429/224
[58] Field of Search ............................ 429/224; 423/49, 423/50, 51, 52, 179.5, 183, 599, 605

[56] References Cited

U.S. PATENT DOCUMENTS

| | | | |
|---|---|---|---|
| 5,196,279 | 3/1993 | Tarascon | 429/194 |
| 5,240,794 | 8/1993 | Thackeray et al. | 429/224 |
| 5,266,299 | 11/1993 | Tarascon | 429/599 |

*Primary Examiner*—Stephen Kalafut
*Attorney, Agent, or Firm*—Herbert M. Hanegan; J. Rodgers Lunsford, III

[57] ABSTRACT

A method for manufacturing $Li_2Mn_2O_4$ comprising the steps of providing $\beta$-$MnO_2$ or $\lambda$-$MnO_2$; providing a source of lithium; dissolving lithium from the lithium source in a liquid medium in which lithium generates solvated electrons or the reduced form of an electron-transfer catalyst; and contacting the $\beta$-$MnO_2$ or $\lambda$-$MnO_2$ with the liquid medium containing the dissolved lithium and the solvated electrons or the reduced form of the electron-transfer catalyst.

26 Claims, No Drawings

LITHIUM MAGANESE OXIDE COMPOUND AND METHOD OF PREPARATION

FIELD OF THE INVENTION

The present invention relates to a lithium manganese oxide compound and its production by contacting β-$MnO_2$ or λ-$MnO_2$ with lithium dissolved in a solvent in which lithium generates solvated electrons or in which a catalyst is present that is capable of accepting an electron from lithium and delivering it to the β-$MnO_2$ or λ-$MnO_2$.

BACKGROUND OF THE INVENTION

The present invention relates to lithiated manganese oxides, to methods of making such materials and to the use of such materials in the manufacture of the cathodes of electrochemical cells incorporating the materials as cathode-active materials.

More particularly it relates to a process for the manufacture of $Li_2Mn_2O_4$ and the use of $Li_2Mn_2O_4$ in electrical storage batteries. Still more particularly, it relates to a process for the manufacture of $Li_2Mn_2O_4$ by the reaction of β-$MnO_2$ or λ-$MnO_2$ with lithium and to using $Li_2Mn_2O_4$ in the manufacturing of the cathode component of rechargeable lithium-ion electrical storage batteries.

Conventionally used nonaqueous electrolyte cells are primary cells which can be used only once. With recent widespread use of video cameras and small-sized audio instruments, there has been an increased need for secondary cells which can be used conveniently and economically for long, repeated use.

Lithium cells useful as electrical storage batteries incorporate a metallic lithium anode and a cathode including an active material which can take up lithium ions. An electrolyte incorporating lithium ions is disposed in contact with the anode and the cathode. During discharge of the cells, lithium ions leave the anode, enter the electrolyte and are taken up in the active material of the cathode, resulting in release of electrical energy. Provided that the reaction between the lithium ions and the cathode active material is reversible, the process can be reversed by applying electrical energy to the cell. If such a reversible cathode-active material is provided in a cell having the appropriate physical configuration and an appropriate electrolyte, the cell can be recharged and reused. Rechargeable cells are commonly referred to in the battery art as secondary cells. It has long been known that useful cells can be made with a lithium metal anode and a cathode-active material which is a sulfide or oxide of a transition metal, i.e., a metal capable of assuming plural different valence states. Dampier, "The Cathodic Behavior of CuS, $MoO_3$, and $MnO_2$ in Lithium Cells," J. Electrochem. Soc., Vol. 121, No. 5, pp. 656–660 (1974) teaches that a cell incorporating a lithium anode and manganese dioxide cathode-active material can be used as an electrical power source. The same reference further teaches that a lithium and manganese dioxide cell can serve as a secondary battery.

There has been considerable effort in the battery field directed towards development of cathode materials based on lithium manganese oxides. Both lithium and manganese dioxide are relatively inexpensive, readily obtainable materials, offering the promise of a useful, potent battery at low cost. Nonaqueous electrolyte primary cells using lithium as a negative electrode-active material and nonaqueous solvent such as an organic solvent as an electrolyte have advantages in that self-discharge is low, nominal potential is high and storability is excellent. Typical examples of such nonaqueous electrolyte cells include lithium manganese dioxide primary cells which are widely used as current sources for clocks and memory backup of electronic instruments because of the long-term reliability.

Secondary lithium batteries using an intercalation compound as cathode and free lithium metal as anode have been studied intensively due to their potential technological significance. Unfortunately, these studies have revealed that inherent dangers associated with the use of free lithium preclude the commercial viability of such batteries. Upon repeated cycling, dendritic growth of lithium occurs at the lithium electrode. Growth of lithium dendrites can lead eventually to an internal short-circuit in the cell with a subsequent hazardous uncontrolled release of the cell's stored energy.

One approach to improving the reversibility of lithium-based anodes involves the use of lithium intercalation compounds. The intercalation compound serves as a host structure for lithium ions which are either stored or released depending on the polarity of an externally applied potential. During discharge the electromotive force reverses the forced intercalation thereby producing current.

Batteries using this approach, in which an intercalation compound is used as the anode instead of free lithium metal, are known in the art as "lithium-ion" or "rocking-chair" batteries. Utilization of $Li_2Mn_2O_4$ in lithium-ion secondary batteries is described in detail in the recent review paper, "The $Li_{1+x}Mn_2O_4$/C Rocking-chair System," J. M. Tarasoon and D. Guyomard, Electrochimica Acta, Vol. 38, No. 9, pp. 1221–1231 (1993).

In this approach, a nonaqueous secondary cell is provided with (a) a negative electrode consisting essentially of a carbonaceous material as a carrier for a negative electrode-active material, said carrier being capable of being doped and dedoped with lithium and (b) a positive electrode comprising lithium manganese complex oxide as an essential positive electrode-active material. This cell has a high expected applicability because dendrite precipitation of lithium does not occur on the surface of the negative electrode, the pulverization of lithium is inhibited, the discharge characteristics are good and the energy density is high.

The output voltage of this lithium-ion battery is defined by the difference in chemical potential of the two insertion compounds. Accordingly, the cathode and anode must comprise intercalation compounds that can intercalate lithium at high and low voltages, respectively.

The viability of this concept has been demonstrated and future commercialization of such cells in D, AA or coin-type batteries has been indicated. These cells include a $LiMn_2O_4$, a $LiCoO_2$, or a $LiNiO_2$ cathode, an electrolyte and a carbon anode. These lithium-ion batteries are described as being superior to nickel-cadmium cells and do not require a stringent environment for fabrication since the lithium based cathode employed is stable in an ambient atmosphere, and the anode is not free lithium metal, but an intercalation compound used in its discharged state (without intercalated lithium) that is stable in ambient atmosphere when the cells are assembled.

However, a nonaqueous electrolyte secondary cell such as described above has disadvantages in that the cell capacity has proven to decrease because some of the lithium doped into the carbonaceous material used as a negative electrode active material cannot be dedoped upon discharge. In practice, either carbon or graphite irreversibly consumes a portion of the lithium during the first charge-discharge cycle. As a result the capacity of the electrochemical cell is decreased in proportion to the lithium that is irreversibly intercalated into the carbon during the first charge.

This disadvantage can be eliminated by using $Li_2Mn_2O_4$ as all or part of the cathode. Upon the first charge of the cell so manufactured, the $Li_2Mn_2O_4$ is converted to $\lambda$-$Mn_2O_4$. When the cell is operated over the appropriate range of electrical potential, subsequent discharge cycles of the cell convert $\lambda$-$Mn_2O_4$ to $LiMn_2O_4$, and charge cycles convert $LiMn_2O_4$ to $\lambda$-$Mn_2O_4$. Because excess lithium is available to satisfy the irreversible consumption by carbon or graphite, cells manufactured using $Li_2Mn_2O_4$ have greater electrical capacity.

The capacity of a lithium ion cell is also limited by the quantity of lithium which can be reversibly removed (i.e. cycled) from the cathode. In the cathode materials of the prior art, only about one half mole of lithium per transition metal can be removed reversibly. Thus, they have limited specific capacity, generally no more than about 140 mAh/g.

In principle, one mole of lithium per mole of manganese can be removed reversibly from $Li_2Mn_2O_4$. In practice, however, cells that cycle between $Li_2Mn_2O_4$ and $LiMn_2O_4$ suffer more rapid loss of electrical capacity than cells that cycle between $LiMn_2O_4$ and $\lambda$-$Mn_2O_4$. Moreover, cells that cycle between $LiMn_2O_4$ and $\lambda$-$Mn_2O_4$ deliver most of their electrical energy between about 4 volts and about 3 volts, whereas, cells that cycle between $Li_2Mn_2O_4$ and $LiMn_2O_4$ deliver most of their electrical energy between about 3 volts and about 2 volts.

Thus, a combination of factors gives a lithium-ion cell that cycles lithium between a carbon or graphite matrix as the anode and $LiMn_2O_4$ as the fully discharged cathode many particularly attractive features. Such cells can be assembled conveniently in an over-discharged state using carbon or graphite for the anode and $Li_2Mn_2O_4$ for the cathode. Because the second lithium ion cannot be used effectively for repeated cycling, its consumption to satisfy the irreversible lithium intercalation of the carbonaceous anode material does not entail any additional loss of electrical capacity.

The compounds $LiMn_2O_4$ and $Li_2Mn_2O_4$ that are useful in this application are known in the art. Depending upon methods of preparation, their stoichiometries can differ slightly from the ideal. They are precisely identified however by their x-ray powder diffraction patterns. The materials herein referred to as $LiMn_2O_4$ and $Li_2Mn_2O_4$ have the diffraction spectra given on cards 35-781 and 38-299, respectively, of the Powder Diffraction File published by the International Centre for Diffraction Data, Newtown Square Corporate Campus, 12 Campus Boulevard, Downtown Square, Pa., 19073-3273, U.S.A.

$LiMn_2O_4$ can be prepared from a wide range of lithium sources and a wide range of manganese sources under a wide range of conditions. U.S. Pat. No. 5,135,732 discloses a method for the low temperature preparation of $LiMn_2O_4$. $LiMn_2O_4$ is one of the raw materials of the present invention.

In contrast, $Li_2Mn_2O_4$ is more difficult to prepare and in fact, known methods for the preparation of $Li_2Mn_2O_4$ are excessively costly. These methods include the electrochemical intercalation of lithium into $LiMn_2O_4$ (W. Li W. R. McKinnon, and J. R. Dahn, J. Electrochem. Soc., Vol. 141, No. 9, pp. 2310–2316), the reaction of $LiMn_2O_4$ with lithium iodide U.S. Pat. No. 5,266,299), and the reaction of $LiMn_2O_4$ with butyl lithium (M. M. Thackeray, W. I. F. David, P. G. Bruce, J. B. Goodenough, Mat. Res. Bull., Vol. 18, pp. 461–472 (1983)).

U.S. Pat. No. 5,196,279 teaches the synthesis of $Li_{1+x}Mn_2O_4$ from LiI and either $LiMn_2O_4$ or $\lambda$-$MnO_2$. The reaction is effected by heating mixtures of the solid reactants to 150° C. in sealed ampoules. $Li_{1+x}Mn_2O_4$ is a mixture of $Li_2Mn_2O_4$ and $LiMn_2O_4$.

U.S. Pat. No. 5,240,794 discloses a variety of lithium and lithium-ion batteries. These include a range of lithium manganese oxide compositions, including the composition $Li_{1+x}Mn_2O_4$. The patent discloses preparative methods for this composition generally involving mixing precursor lithium compounds and manganese compounds. The mixtures are then heated at elevated temperatures (typically 300° C.) in a reducing atmosphere (typically hydrogen gas) for several hours (typically 24 hours).

SUMMARY OF THE INVENTION

It is an object of the present invention to provide a nonaqueous electrolyte secondary cell having an increased cell capacity which comprises a negative electrode consisting essentially of a carrier for a negative electrode active material and a positive electrode comprising a lithium manganese oxide as an essential positive electrode active material.

In accordance with the present invention, the above object can be accomplished by $Li_2Mn_2O_4$ prepared by contacting $\beta$-$MnO_2$ or $\lambda$-$MnO_2$ with lithium suspended or dissolved in a solvent in which lithium generates solvated electrons or in which a catalyst is present that is capable of accepting an electron from lithium and delivering it to the $\beta$-$MnO_2$ or $\lambda$-$MnO_2$ reactant.

DESCRIPTION OF THE PREFERRED EMBODIMENT

As noted above, this invention is directed to a method of manufacturing $Li_2Mn_2O_4$. Specifically such method is accomplished by providing $\beta$-$MnO_2$ or $\lambda$-$MnO_2$, a source of lithium, dissolving lithium from the lithium source in a liquid medium in which lithium generates solvated electrons or the reduced form of an electron-transfer catalyst and contacting the $\beta$-$MnO_2$ or $\lambda$-$MnO_2$ with the lithium-containing liquid medium.

The source of lithium can be any source which makes elemental lithium available for reaction.

In accordance with the present invention lithium is dissolved by a liquid medium solvent in which lithium generates solvated electrons or the reduced form of an electron-transfer catalyst and contacting the $\beta$-$MnO_2$ or $\lambda$-$MnO_2$ with the dissolved lithium. Advantageously the solvent is selected from the group consisting of ammonia, organic amines, ethers, pyridine, substituted pyridines, mixtures of ammonia and amines, and mixtures of ammonia and ethers. Preferably the solvent is ammonia, organic amines, or pyridines. When the solvent is ammonia the contacting step is advantageously carried out at a temperature of from about minus 30° C. to about minus 50° C. Preferably the temperature during the contacting step is maintained at from about minus 33° C. to about minus 45° C. When ammonia is the solvent it is preferred that it be in liquid form.

If the solvent used in the method of this invention is an organic amine, it is advantageously selected from the group consisting of methylamines, ethylamines, propylamines, and butylamines. Advantageously, the method of this invention is carried out wherein the organic amine is a liquid. Preferably the contacting step of the present method is carried out at a temperature of from about minus 25° C. to about 100° C. Preferably the contacting step is carded out from a temperature of from about 20° C. to about 90° C.

If the solvent used in the method of this invention is a pyridine or a substituted pyridine, the contacting step is advantageously carried out at a temperature from about minus 5° C. to about 190° C. Preferably when using pyridine or a substituted pyridine as the solvent the contacting step is carried out at a temperature of from about 30° C. to about 165° C.

Advantageously in the present invention, the solvent is a liquid medium in which an electron-transfer catalyst is dissolved and the liquid medium preferably is a liquid at the reaction temperature.

As discussed above, the use for which the $Li_2Mn_2O_4$ prepared by the method of this invention is uniquely applicable is as a cathode for use in a secondary lithium ion electrochemical cell. Such a cell may be of known design having a lithium intercalation anode, a suitable nonaqueous electrolyte, a cathode of material made by the method of this invention, and a separator between the anode and the cathode. The anode may be of known materials such as transition metal oxides, transition metal sulfides and carbonaceous materials. The nonaqueous electrolyte can be in the form of a liquid, a gel, or a solid matrix that contains mobile lithium ions.

The process of the present invention can optionally be practiced by providing an electron-transfer catalyst to the suspension of $\beta$-$MnO_2$ or $\lambda$-$MnO_2$ before or after the addition of lithium. Advantageously, the catalyst is selected from the group consisting of sulfur, sulfides, reducible sulfur compounds, iodine, iodides, reducible iodine compounds, pyridine, pyridine derivatives, and benzophenone.

Analysis of the products of this invention relies on X-ray diffraction. X-ray diffraction characterizes crystalline phases. It provides very reliable identifications of the compounds present in a sample, but it may not be a good quantitative-analysis method; poorly crystalline compounds or compounds which are present in small mounts (i.e., a few percent) may not be detected. Thus, undetected impurities, including $LiMn_2O_4$, could be present at low levels in the $Li_2Mn_2O_4$ so produced. However, it is also true that the chemical characteristics of $Li_2Mn_2O_4$ and the conditions of the X-ray diffraction measurement interact in a way which exaggerates the estimated amount of starting material left in the $Li_2Mn_2O_4$ product. If a $Li_2Mn_2O_4$ sample is exposed to laboratory air for several minutes in the course of making a diffraction measurement, $Li_2Mn_2O_4$ reacts with oxygen and water from the air to produce $LiMn_2O_4$ and LiOH as set forth in the following equation:

$$4\ Li_2Mn_2O_4 + 2\ H_2O + O_2 \rightarrow 4\ LiMn_2O_4 + 4\ LiOH$$

Successive X-ray spectra taken on the same sample show that the amount of $LiMn_2O_4$ present in the sample increases as the duration of its exposure to the atmosphere increases. Because the reaction requires that atoms diffuse between the surface of an individual particle and its interior, the reaction probably produces a growing shell of $LiMn_2O_4$ that surrounds a shrinking core of $Li_2Mn_2O_4$. Because the length of the diffusion path increases as the extent of reaction increases, the reaction is fast for pure $Li_2Mn_2O_4$ and much slower for partially converted $Li_2Mn_2O_4$ whose surface is already covered with $LiMn_2O_4$.

EXAMPLE

This Example demonstrates that $Li_2Mn_2O_4$ is produced by the reaction of elemental lithium with $\beta$-$MnO_2$ in refluxing pyridine.

A 500 ml three-neck round-bottom flask was mounted on a ring stand in a hood. It was fitted with an overhead stirrer, a thermometer, a reflux condenser, and provision for purging with argon. The assembled apparatus was vented to the atmosphere through a mineral-oil filled check valve. $\beta$-$MnO_2$ (50.00 g, 575 millimoles) was charged to the flask and covered with 200 ml pyridine. The $\beta$-$MnO_2$ was taken from a bottle labeled: "I.C. No. 6 Beta Manganese Dioxide (A reagent grade manganese dioxide purchased from Fischer Scientific co. and adopted as an international common sample on Sep. 1, 1976.)"

In a dry box, 4.00 g (576 Millimoles) of lithium foil was cut into 1 cm² pieces and charged to an Erlenmeyer flask, which was then tightly stoppered. The lithium pieces were transferred quickly in air from the Edenmeyer flask to the round-bottom flask. Stirring was begun, and the temperature increased quickly to the boiling point. By the time the temperature reached 100° C. the solution had become deep purple. Once the boiling point was reached, the heat evolved by the reaction was sufficient to continue refluxing the pyridine for several minutes. Thereafter, a heating mantle was applied, and the suspension was refluxed for an additional 3 hours. At that time, the suspended solids were brown, and the purple color was no longer evident.

The suspended solids were recovered by filtration in an argon atmosphere and washed on the frit with two 50-ml portions of THF. The THF filtrates were yellow-brown. The product was superficially dried on the frit and transferred to a Schlenk tube. Solvent was removed by evacuation in an oil-pump vacuum with intermittent heating using a hot-air gun. The product was analyzed by X-ray diffraction. The spectrum obtained had wide peaks and poor signal-to-noise characteristics. Peaks attributable to $Li_2Mn_2O_4$ were present; no other phases were evident. (Found: 7.5% Li, 46.3% $MnO_2$, 57.2% Mn, 5.2% C, 0.66% H, 1.0% N. Theoretical for $Li_2Mn_2O_4$: 7.4% Li, 46.3% $MnO_2$, 58.5% Mn. Calculated from the Li and Mn analyses, x in $Li_{1+x}Mn_2O_4$ is 1.07; from the $MnO_2$ and Mn analyses, x is 0.95.

What is claimed is:

1. A method for manufacturing $Li_2Mn_2O_4$ comprising the steps of:

(a) Providing $\beta$-$MnO_2$ or $\lambda$-$MnO_2$;

(b) Providing a source of lithium;

(c) Providing a liquid medium selected from the group consisting of ammonia, organic amines, ethers, pyridine, substituted pyridines, mixtures of ammonia and amines, and mixtures of ammonia and ethers in which lithium generates solvated electrons or in which lithium generates the reduced form of an electron-transfer catalyst;

(d) Dissolving lithium from the lithium source in the liquid medium; and (e) Contacting the $\beta$-$MnO_2$ or $\lambda$-$MnO_2$ with the liquid medium containing the dissolved lithium and the solvated electrons or the reduced form of the electron-transfer catalyst.

2. The method of claim 1 wherein the liquid medium is ammonia.

3. The method of claim 2 wherein the temperature during the contacting step is maintained at from about minus 30° C. to about minus 50° C.

4. The method of claim 3 wherein the temperature during the contacting step is maintained at from about minus 33° C. to about minus 45° C.

5. The method of claim 1 wherein the liquid medium is an organic amine.

6. The method of claim 5 wherein the contacting step is carried out at a temperature of from about minus 25° C. to about 100° C.

7. The method of claim 6 wherein the contacting step is carried out at a temperature of from about 20° C. to about 90° C.

8. The method of claim 5 wherein the organic amine is selected from the group consisting of methylamines, ethylamines, propylamines and butylamines.

9. The method of claim 1 wherein the solvent is pyridine.

10. The method of claim 9 wherein the contacting step is carried out at a temperature of from about minus 5° C. to about 190° C.

11. The method of claim 10 wherein the contacting step is carried out at a temperature of from about 35° C. to about 125° C.

12. The method of claim 1 wherein the liquid medium is a substituted pyridine.

13. The method of claim 12 wherein the contacting step is carried out at a temperature of from about minus 5° C. to about 190° C.

14. The method of claim 13 wherein the contacting step is carried out at a temperature of from about 35° C. to about 165° C.

15. The method of claim 1 wherein the liquid medium is a mixture of ammonia and amines.

16. The method of claim 1 wherein the liquid medium is a mixture of ammonia and ethers.

17. The method of claim 1 wherein the liquid medium is an ether.

18. The method of claim 1 including the step of adding a catalyst to the $\beta$-$MnO_2$ or $\lambda$-$MnO_2$ prior to step (b).

19. The method of claim 1 including the step of adding a catalyst to the $\beta$-$MnO_2$ or $\lambda$-$MnO_2$ immediately prior to step (d).

20. The method of claim 1 including the step of adding a catalyst to the $\beta$-$MnO_2$ or $\lambda$-$MnO_2$ immediately after step (d).

21. The method of claim 18 wherein the catalyst is selected from the group consisting of sulfur, sulfides, reducible sulfur compounds, iodine, iodides, reducible iodine compounds, pyridine, pyridine derivatives, and benzophenone.

22. The method of claim 19 wherein the catalyst is selected from the group consisting of sulfur, sulfides, reducible sulfur compounds, iodine, iodides, reducible iodine compounds, pyridine, pyridine derivatives, and benzophenone.

23. The method of claim 20 wherein the catalyst is selected from the group consisting of sulfur, sulfides, reducible sulfur compounds, iodine, iodides, reducible iodine compounds, pyridine, pyridine derivatives, and benzophenone.

24. The method of claim 1 wherein the liquid medium is a solvent in which an electron-transfer catalyst is dissolved.

25. The method of claim 24 wherein the liquid medium is a mixture of compounds which is a liquid at the contacting step temperature of from about 5° C. to about 190° C.

26. The method of claim 24 wherein the catalyst is selected from the group consisting of sulfur, sulfides, reducible sulfur compounds, iodine, iodides, reducible iodine compounds, pyridine, pyridine derivatives, and benzophenone.

* * * * *

UNITED STATES PATENT AND TRADEMARK OFFICE
CERTIFICATE OF CORRECTION

PATENT NO. : 5,641,465
DATED : June 24, 1997
INVENTOR(S) : Paul C. Ellgen and Terrell N. Anderson It is certified that error appears in the above-indentified patent and that said Letters Patent is hereby corrected as shown below:

Column 4, line 58, delete "carded" and insert --carried--

Signed and Sealed this

Seventh Day of October, 1997

*Attest:*

BRUCE LEHMAN

*Attesting Officer*     Commissioner of Patents and Trademarks